US008576271B2

(12) United States Patent
Moore et al.

(10) Patent No.: US 8,576,271 B2
(45) Date of Patent: Nov. 5, 2013

(54) COMBINING DIRECT AND ROUTED COMMUNICATION IN A VIDEO CONFERENCE

(75) Inventors: Timothy Moore, Bellevue, WA (US); Dalibor Kukoleca, Redmond, WA (US); Jiannan Zheng, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 649 days.

(21) Appl. No.: 12/823,932

(22) Filed: Jun. 25, 2010

(65) Prior Publication Data
US 2011/0316965 A1 Dec. 29, 2011

(51) Int. Cl.
G06F 15/16 (2006.01)
H04L 12/16 (2006.01)
H04N 7/15 (2006.01)

(52) U.S. Cl.
USPC ............... 348/14.08; 348/14.01; 348/14.09; 348/14.12; 348/14.13; 348/386.1; 370/260; 370/263; 370/401; 375/240.01; 375/240.12; 375/240.26; 382/254; 709/203; 709/205; 709/226; 709/231; 709/233; 715/758; 725/95; 725/114; 725/116

(58) Field of Classification Search
USPC .......... 348/14.01, 14.08, 14.09, 14.12, 14.13, 348/14.07, 386.1; 370/260, 263, 401; 375/240.26, 240.01, 240.12; 382/254; 709/203, 204, 226, 227, 231, 205, 233; 715/758; 725/95, 114, 116
See application file for complete search history.

(56) References Cited

U.S. PATENT DOCUMENTS

| | | | |
|---|---|---|---|
| 5,687,095 A * | 11/1997 | Haskell et al. ............. | 348/386.1 |
| 6,501,797 B1 * | 12/2002 | van der Schaar et al. ..................... | 375/240.12 |
| 6,580,754 B1 * | 6/2003 | Wan et al. ................ | 375/240.01 |
| 6,584,077 B1 * | 6/2003 | Polomski ...................... | 370/263 |
| 7,007,098 B1 * | 2/2006 | Smyth et al. .................. | 709/233 |
| 7,034,860 B2 * | 4/2006 | Lia et al. .................... | 348/14.09 |
| 7,089,285 B1 * | 8/2006 | Drell ............................. | 709/204 |
| 7,349,944 B2 * | 3/2008 | Vernon et al. ................. | 709/204 |
| 7,362,349 B2 | 4/2008 | Nelson et al. ............ | 348/14.08 |
| 7,447,740 B2 * | 11/2008 | AbiEzzi et al. .............. | 709/204 |
| 7,764,632 B2 * | 7/2010 | Gray et al. ..................... | 370/260 |
| 8,115,800 B2 * | 2/2012 | Murai et al. ............... | 348/14.13 |

(Continued)

OTHER PUBLICATIONS

Cycon, H.L., et al.; "*A Fast Wavelet-Based Video Codec and Its Application in an IP Version 6-Ready Serverless Videoconferencing System*"; University of Applied Sciences, Berlin, DE; accessed Apr. 15, 2010 at http://citeseerx.ist.psu.edu/viewdoc/download?doi=10.1.1.4.7823&rep=rep1&type=pdf; 7 pgs.

(Continued)

*Primary Examiner* — Gerald Gauthier
(74) *Attorney, Agent, or Firm* — Merchant & Gould

(57) ABSTRACT

A video conference cross-links at least a portion of the clients for point to point communication while still using a video conference server. The video conference server continues to manage some aspects of the video conference for the cross-linked clients and may be configured to perform audio/video processing for some of the clients in a video conference. For example, the video conference server may perform audio/video processing and routing of streams for clients that do not have the capabilities to perform the processing directly. Clients that are able to process their audio/video needs may directly connect to other clients through cross-links while still using the video conference server for management.

20 Claims, 7 Drawing Sheets

(56) References Cited

U.S. PATENT DOCUMENTS

| | | | |
|---|---|---|---|
| 8,144,187 B2* | 3/2012 | Moore et al. | 348/14.12 |
| 8,184,720 B2* | 5/2012 | Onur et al. | 375/240.26 |
| 8,243,119 B2* | 8/2012 | Thapa | 348/14.08 |
| 8,319,816 B1* | 11/2012 | Swanson et al. | 348/14.01 |
| 8,380,790 B2* | 2/2013 | Lee et al. | 709/205 |
| 2004/0119814 A1* | 6/2004 | Clisham et al. | 348/14.08 |
| 2005/0010638 A1* | 1/2005 | Richardson et al. | 709/204 |
| 2005/0013309 A1* | 1/2005 | Ravishankar et al. | 370/401 |
| 2005/0091696 A1* | 4/2005 | Wolfe et al. | 725/116 |
| 2006/0244818 A1* | 11/2006 | Majors et al. | 348/14.08 |
| 2007/0143804 A1* | 6/2007 | Wang | 725/95 |
| 2007/0183678 A1* | 8/2007 | Sankar et al. | 382/254 |
| 2008/0043090 A1* | 2/2008 | Wiener | 348/14.09 |
| 2008/0059986 A1* | 3/2008 | Kalinowski et al. | 725/1 |
| 2008/0068446 A1* | 3/2008 | Barkley et al. | 348/14.07 |
| 2008/0095079 A1* | 4/2008 | Barkley et al. | 370/260 |
| 2008/0158337 A1* | 7/2008 | Richardson | 348/14.09 |
| 2008/0183808 A1* | 7/2008 | Salesky et al. | 709/203 |
| 2009/0231415 A1* | 9/2009 | Moore et al. | 348/14.09 |
| 2010/0009758 A1 | 1/2010 | Twitchell, Jr. | 463/42 |
| 2010/0066807 A1 | 3/2010 | Eisenberg | 348/14.08 |
| 2010/0149301 A1* | 6/2010 | Lee et al. | 348/14.08 |
| 2010/0153574 A1* | 6/2010 | Lee et al. | 709/231 |
| 2010/0306813 A1* | 12/2010 | Perry et al. | 725/114 |
| 2010/0318662 A1* | 12/2010 | Wie et al. | 709/226 |
| 2011/0055735 A1* | 3/2011 | Wood et al. | 715/758 |
| 2011/0179104 A1* | 7/2011 | Hakoda et al. | 709/203 |
| 2011/0252146 A1* | 10/2011 | Santamaria et al. | 709/227 |
| 2011/0310216 A1* | 12/2011 | Lee et al. | 348/14.08 |
| 2011/0310217 A1* | 12/2011 | Lee et al. | 348/14.08 |
| 2011/0316965 A1* | 12/2011 | Moore et al. | 348/14.09 |
| 2012/0176469 A1* | 7/2012 | Moore et al. | 348/14.13 |

OTHER PUBLICATIONS

Shim, H.S., et al.; "*An Example of Using Presence and Availability in an Enterprise for Spontaneous, Multiparty, Multimedia Communications*"; Applied Research, Telcordia Technologies, New Jersey, USA; accessed Apr. 15, 2010 at http://citeseerx.ist.psu.edu/viewdoc/download?doi=10.1.1.16.9007&rep=rep1&type=pdf; 11 pgs.

Crichigno, J.; "*An RTP/SIP Conference Server Based on Linear Mixing Streams*"; May 2006; The University of New Mexico, College of Engineering, School of Electrical and Computer Engineering, Albuquerque, New Mexico; 16 pgs.

Tirasoontorn, K., et al.; "*Distributed P2P-SIP Conference Construction*"; Sep. 10-12, 2008; The International Conference on Mobile Technology, Applications & Systems 2008 (Mobility Conference); Ilan, Taiwan; 6 pgs.

* cited by examiner

COMBINING DIRECT AND ROUTED COMMUNICATION IN A VIDEO CONFERENCE

BACKGROUND

Many people today participate in video conferences. In some video conferencing systems, the video conferencing clients are connected to a video conference server. The video conference server manages and controls the clients in the conference and routes the audio/video streams to the clients. In other video conferencing systems, the clients are directly connected to one another and the clients manage the conference. Clients that participate in video conferences typically have different processing capabilities and available bandwidth. For example, some clients may be able to encode and play back at 1080p resolution (1920×1080 pixels per frame) with a frame rate of 30 frames per second (fps), while other clients may only be able to encode and receive at CIF resolution (320×240) with a 15 fps rate.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

A video conference cross-links at least a portion of the clients for point to point communication while still using a video conference server. The video conference server is configured to manage some aspects of the video conference for the cross-linked clients and may be configured to perform audio/video processing for some of the clients in a video conference. For example, the video conference server may perform audio/video processing and routing of streams for clients that do not have the capabilities to perform the processing directly. Clients that are able to process their audio/video needs may directly connect to other clients through cross-links while still using the video conference server for management.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
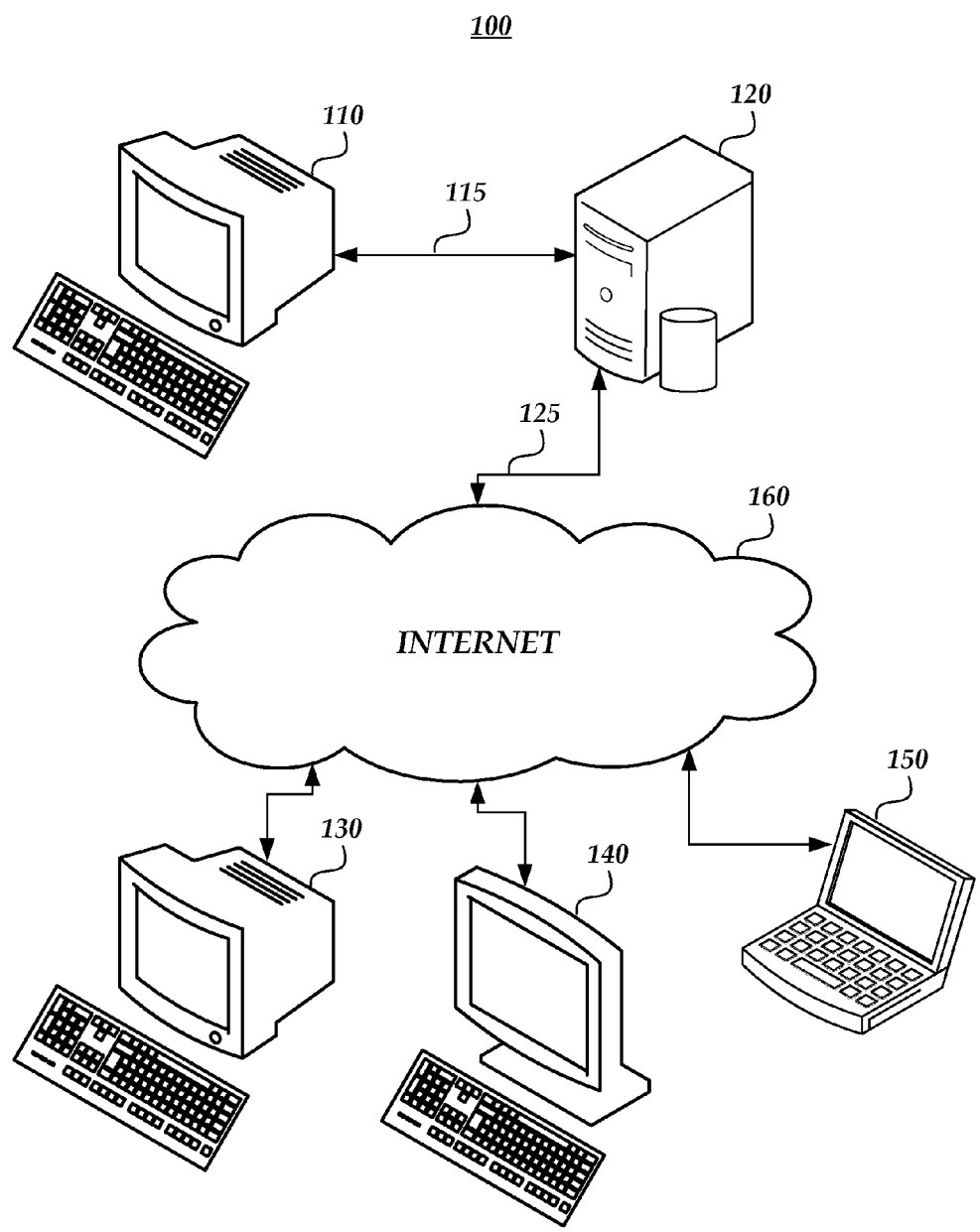
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

FIG. 1 is a block diagram of an operating environment. The operating environment may comprise a video conference environment 100. Video conference environment 100 may comprise a variety of clients having a variety of capabilities, such as an intranet client 110 and a video conference server 120 connected via an intranet network connection 115. Video conference environment 100 may further comprise a first Internet client 130, a second Internet client 140, and a third Internet client 150. Each of the Internet clients may be connected to video conference server 120 via the Internet 160. Video conference server 120, intranet client 110, first Internet client 130, second Internet client 140, and third Internet client 150 may each comprise a computing device 700, described below in greater detail with respect to FIG. 7.

Video conference environment 100 may be used when two or more clients want to share data streams amongst each other. Each client may connect to a video conference using video conference server 120. Video conference server 120 may maintain a list of which clients are connected and each client's capabilities.

The capabilities may be provided by the clients participating in the video conference and/or obtained by the video conference server. The capabilities for each of the clients may include all or a portion of the following, but are not limited to the: processing power, resolution capability, frame rate, bitrate, connection speed, available bandwidth, camera being used, encoding/decoding capability and the like of a client. The capabilities may be different for some/all of the clients. For example, some clients may be able to encode and play back at lower resolutions (e.g. CIF resolution (320×240) with a rate of 15 frames per second (fps) rate); some at medium resolutions (e.g. VGA resolution (640×480 pixels per frame) with a frame rate of 30 fps); and others at higher resolutions (e.g. 720p and 1080p with a 30 fps rate). Additionally, some of the clients may be able to encode and play back a larger number of streams. The clients may also provide video conference server 120 with their desired preferences for viewing and playing video (e.g. full screen mode, full scale mode, small-window mode, bitrate and frame rate).

Video conference server 120 may periodically update any changes in the client's capabilities. For example, video conference server 120 may either periodically automatically analyze or manually analyze network connections and determine that a client has more bandwidth available than previously determined. Video conference server 120 may also receive a message from a client that indicates a change in capability and store that information for use in facilitating the generation of the streams, the data sharing, and cross-linking.

Video conference server 120 uses this information to determine clients that may be cross-linked such that the cross-linked clients communicate directly without the streams being routed through the video conference server 120. Generally, when a video conference server is used to route all of the streams in a conference, the video conference server is a concentration of bandwidth in the network. Relaying streams through the video conference server adds an additional hop to the route between clients that adds latency and can possibly decrease the quality of the video conference. The scalability of the video conference server is also reduced when all of the streams of the video conference are passed through the video conference server. Clients that are cross-linked, however, offload some of the resources from the video conference server such that it may use its resources in other ways. For example, more video conferences may be able to be hosted on a video conference server when all or a portion of clients in a video conference are cross-linked.

After determining the cross-links to establish, video conference server 120 sends requests to the clients to establish the cross-links. The cross-link establishes a point-to-point connection between the cross-linked clients. At any point during a video conference, video conference server 120 may request (or a cross-linked client may request) to cancel the cross-linking. While cross-linked clients send streams directly to one another, video conference server may still route generated video streams from a cross-linked client to another client in the video conference that is not cross-linked. Additionally, video conference server 120 may manage the video conference and provide messages to the cross-linked clients. For example, video conference server 120 may handle clients being added/removed from the conference as well as provide cross-linked clients with notifications of changes in the conference such as a dominant speaker change, bandwidth change, subscription request change and the like.

Video conference server 120 may also be configured to determine what clients are to generate streams (e.g. audio, video, app sharing, and the like) and request the generated data streams to be sent to one or more destinations. For example, video conference server 120 may request that a stream generated by a cross-linked client (e.g. client 130) also be sent to the server 120 in addition to any cross-linked client(s) (e.g. client 140 and client 150). Video conference server 120 may then route one or more streams to one or more clients that is not cross-linked to the client that generated the stream. For example, vide conference server 120 may receive stream 230 from client 130 and direct the stream to client 110.

Figure 2:
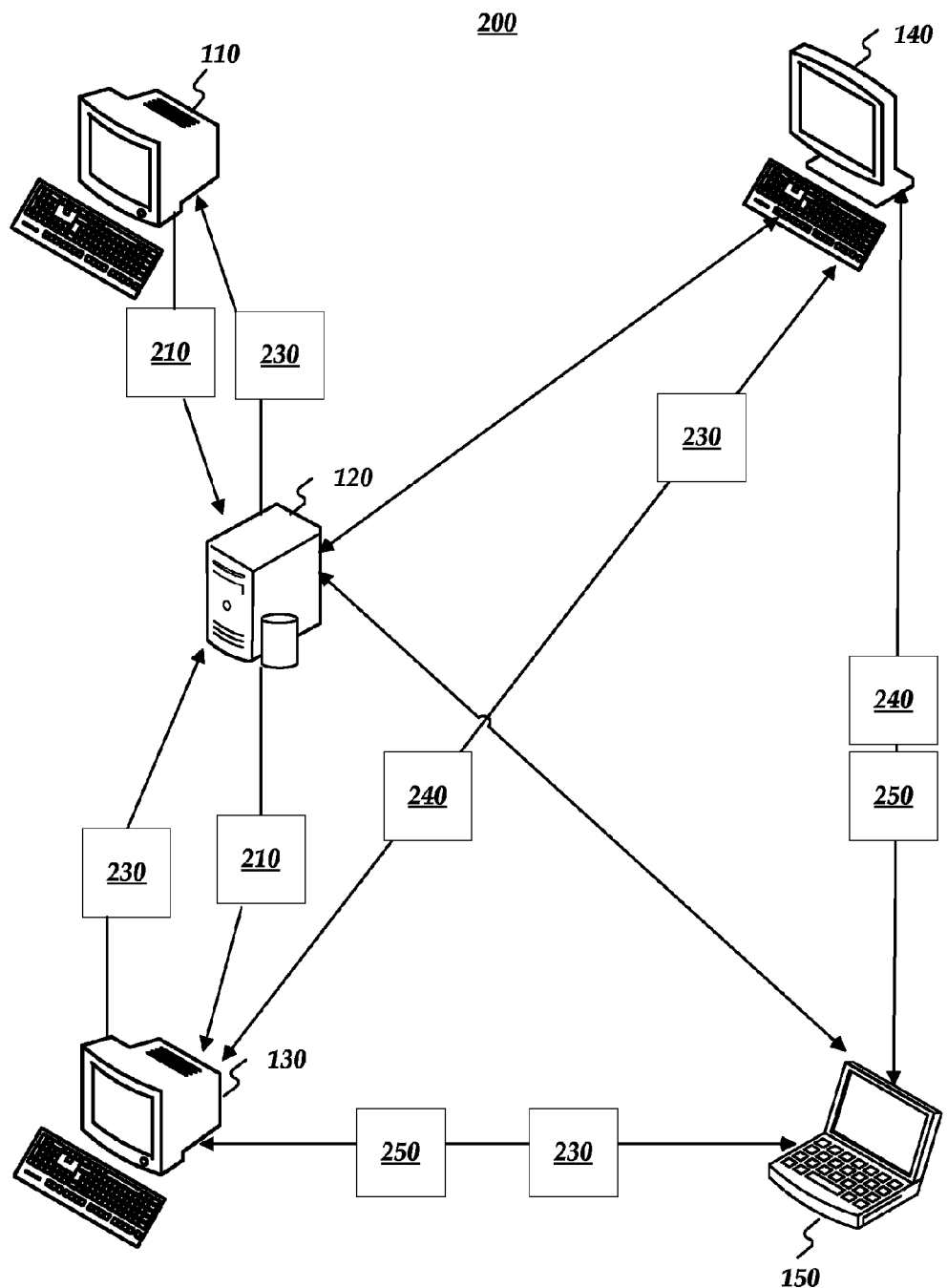
FIG. 2 is a diagram illustrating different cross-linked clients in a video conference environment.

FIG. 2 is a diagram 200 illustrating different cross-linked clients in a video conference environment.

Each client may generate one or more data streams to send to video conference server 120 and/or some other destination. Each client may have an audio/video input such as a webcam and/or microphone connected to the client. The input may be used in the generation of one or more video streams (that may include audio) and encoding of the video stream(s) before sending it to the determined destination(s) (i.e. video conference server 120 and/or a cross-linked client.

For example, client 130 may encode a video stream as a series of video frames comprising a person currently talking. A video stream may be encoded as a series of video frames wherein each frame may comprise a single image. Each frame may be represented by bits of data. The video stream may be encoded so that not every bit of data in every frame needs to be sent in order to represent the source of the video stream. Different frame types may be used to encode and/or compress the video stream. Frame types may comprise I-frames, P-frames, and B-frames. I-frame stands for Intra-Frame, and may comprise a frame that may be decoded by itself without reference to any other frame in a video stream. P-frame stands for Predicted Frame and may be decoded by referencing at least one previous frame in the video stream sequence. B-frame stands for Bidirectional Predicted Frame and may be decoded by referencing at least one previous frame and at least one subsequent frame in the video stream. A client may generate streams for more than one resolution. For example, client 130 may be configured to generate streams for 1080p, 720p, 480p, and CIF.

Video conference server 120 is configured to determine the capabilities of the clients, help in establishing cross-links between clients, and direct generated streams to the appropriate client(s). For example, video conference server 120 may determine that client 130, client 140, and client 150 have the capability to be cross-linked and that client 110 does not have the capability to be cross-linked.

As discussed above, capabilities and requests of the clients may be determined by video conference server 120. Generally, the requests relate to the desired manner in which to view the video sources and the capabilities relate to the capability of the device for displaying and encoding/decoding video. For example, client 110 may request a subscription to a video stream (230) from client 130. A client may also wish to see video streams from all participating clients in the video conference. For example, client 140 may request to subscribe to video streams (210, 240 and 250). Client 150 may request a subscription to a video stream (210, 230) from client 110 and client 130. As illustrated, client 130 has requested to subscribe to video streams (210, 240 and 250) from client 110, client 140, and client 150.

Video conference server 120 uses this information to determine what clients are to be cross-linked. Video conference server 120 may be configured to: (1) determine whether the clients are capable of direct cross-links; (2) determine whether server scale would be improved by cross-linking two or more clients; (3) determine whether bandwidth management permits the establishment of the cross-links; (4) determine whether audio/video quality would be improved; (5) determine if the location of the clients is appropriate for cross-linking, and the like. Generally, video conference server 120 determines if a cross-link is an advantage to the conference. Video conference server 120 may also determine to only offload a portion of the streams in a cross-link. For example, video conference server 120 may offload streams that require a large amount of bandwidth, such as HD (High Definition) streams.

When a cross-link is to be established, video conference server 120 requests the clients to establish a cross-link. For example, video conference server 120 may send a message to one of the clients to establish a cross-link with another client. According to an embodiment, once the cross-link is available to be used, each client within the cross-link examines the connection (e.g. bandwidth, quality, and the like) and determines whether the connection through the video conference server 120 is better or whether the direct cross-link between the clients is better. When the direct cross-link is better, video conference server 120 stops routing the determined streams to the cross-linked client. Video conference server 120 determines whether the streams it was sending to the cross-linked client are being sent to any other client, and if not, it requests the originating client to stop sending the streams to it thereby saving network bandwidth and processing on the client and video conference server 120. Video conference server 120 may re-establish sending the streams at any time during the video conference. For example, client 150 may request the cross-links between itself and any of its cross-linked clients be canceled. Video conference server 120 may also cancel the cross-link(s) by issuing a message to the affected cross-linked clients.

Client 130 may send stream 230 that it generates to video conference server 120 and directly to client 150 and client 140. Client 140 may send stream 240 that it generates directly to client 150 and client 130. Client 150 may send stream 250 that it generates to client 130 and client 140 and client 110 may send the video stream 210 it generates to video conference server 120. Video conference server 120 directs any received streams to the requested destination(s).

The determined stream configurations may change during the video conference. The video conference server 120, or a client, may send updated information at any time during the video conference to allow the other clients adapt to the change of conditions/configurations of the clients (such as bandwidth, video viewing mode of a particular stream from big/full screen to sub-window mode, or the addition/removal of clients). According to one embodiment, when there is a status change of a client, the client notifies the video conference server 120. Video conference server 120 then uses this information to update the clients of the video conference.

Any cross-links that are established between clients may follow bandwidth policies. For example, a bandwidth policy may specify that only a certain percentage of available bandwidth be used for video conferencing. Video conference server 120 may be configured to monitor the bandwidth being used by the clients and adjust the cross-links appropriately based on the bandwidth usage. In addition to video/audio streams being cross-linked, other data sharing between the cross-links may be implemented. For example, application sharing may be set up directly between clients while allowing a server, such as video server 120, to manage the sharing.

Figure 3:
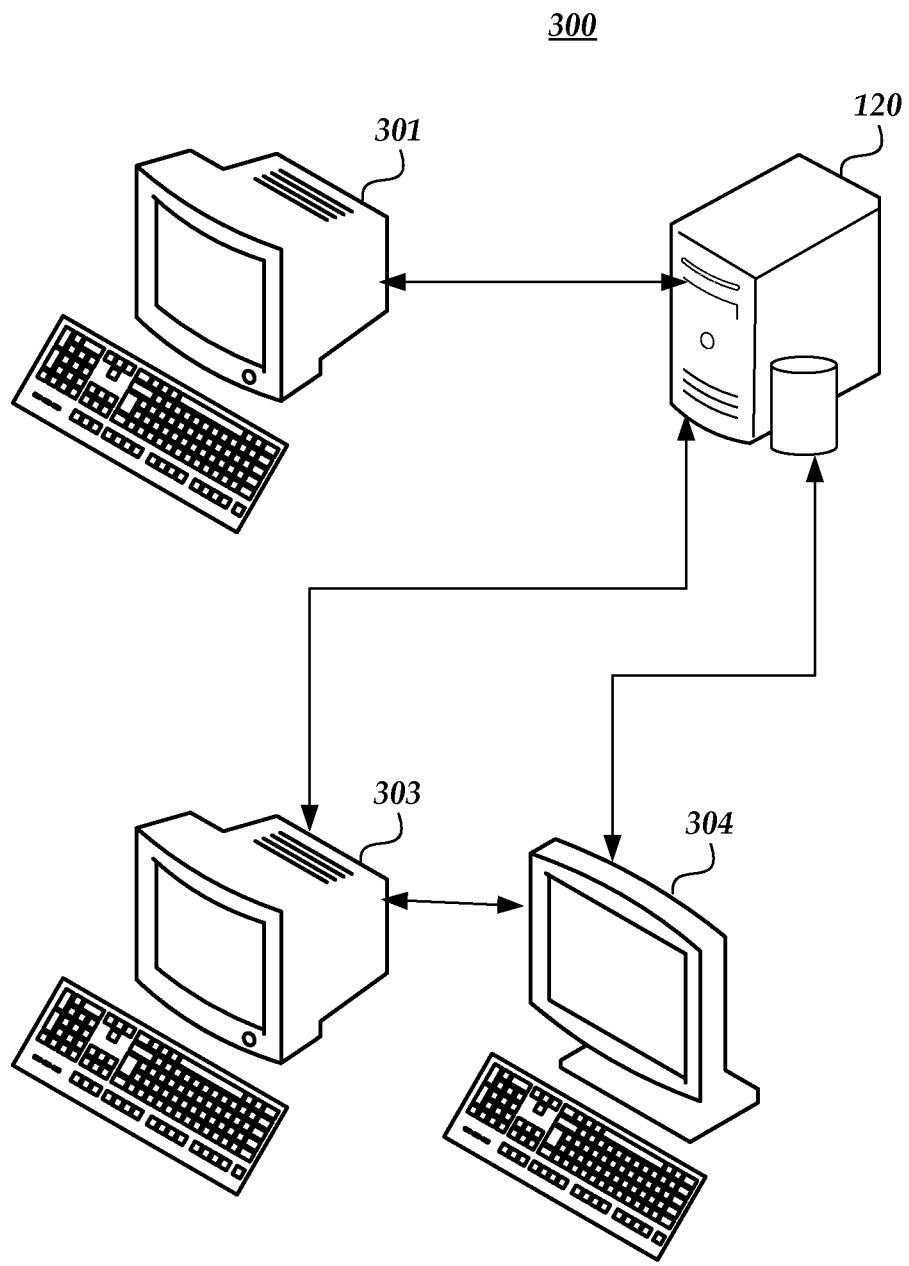
FIG. 3 is a diagram illustrating subscribing to a video conference.

FIG. 3 is a diagram illustrating subscribing to a video conference. As illustrated, video conference system 300 comprises a video conference server 120 and a variety of clients, such as client 301, client 303, and client 304.

Clients in video conference system 300 may connect with different bandwidths and/or different video encoding and/or decoding capabilities. Each client in video conference system 300 may register with video conference server 120 and establish capabilities such as available bandwidth, a maximum encoding resolution, a maximum decoding resolution, and available data encoding and/or decoding algorithms. For example, client 301 may register with video conference server 120 and establish an available bandwidth of 2 Mbps with capability to encode/decode a video stream with VGA (640×480) resolution at 30 fps and CIF (320×240) resolution at 15 fps. Client 303 may register with video conference server 120 and establish an available bandwidth of 150 Kbps with capability to encode/decode a video stream with 720p (1280×720) resolution at 30 fps, VGA (640×480) resolution at 30 fps, and CIF (320×240) resolution at 15 fps. Client 304 may register with video conference server 120 and establish an available bandwidth of 200 Kbps with capability to encode/decode a video stream only at CIF (320×240) resolution at 15 fps.

Clients may be capable of encoding a video stream they may be incapable of decoding, and vice versa. For example, client 304 may be capable of receiving and decoding VGA resolution video streams, but may only be able to encode a CIF resolution video stream. In this scenario, client 301 and client 303 may only encode streams at VGA resolution that video conference server 120 may send to client 304. The CIF resolution encoded video stream from client 304 may be sent to client 301 and client 303.

After a video conference call is established and the capabilities for each client are registered with video conference server 120, video conference server 120 may communicate an encoding request to each client. For example, client 301 and client 303 may be requested to each encode two video resolutions of video streams—a first version of the video stream may be encoded with VGA resolution at 30 fps and a second version of the video stream may be encoded with CIF resolution at 15 fps. Client 304 may be requested to encode one set of video streams with CIF resolution at 15 fps.

As discussed above, video conference server 120 may also instruct two or more of the clients to establish a cross-link between them so that stream(s) may be sent directly between the cross-linked clients. A cross-linked client may still be instructed to send generated streams to the video conference server 120. For example, client 303 and 304 may be cross-linked.

Video conference server 120 may then receive stream(s) that are generated by a client and choose at least one received stream to send to other client(s) based on the registered and/or determined capabilities of each client. For example, video conference server 120 may determine that client 304 is only capable of decoding a CIF resolution video stream while client 301 and client 303 are capable of decoding both VGA resolution and CIF resolution video streams.

Video conference server 120 may then send the CIF resolution stream generated by client 304 to client 301. Client 304 sends the CIF resolution stream directly to client 303 since they are cross-linked. Video conference server 120 may send the VGA resolution stream generated by client 301 to client 303 and the CIF stream generated by client 301 to client 304. Similarly, video conference server 120 may send the VGA resolution stream from client 303 to client 301 and the CIF stream from client 303 to client 304.

Video conference server 120 may determine whether each client has sufficient bandwidth to receive a video stream and may choose a different stream based on that determination. Consistent with further embodiments of the invention, video conference server 120 and/or one of the clients such as client 303 may periodically re-evaluate the amount of bandwidth available. For example, video conference server 120 may determine that bandwidth available to client 303 has dropped from 150 Kbps to 75 Kbps and may begin sending the CIF resolution video stream instead of the VGA resolution video stream from client 301 to client 303.

Video conference server 120 may also periodically re-evaluate each client's encoding/decoding capabilities, and dynamically alter what encoding algorithms are requested for video streams for each client as well as to adjust any established cross-links. The re-evaluation may be performed automatically at predetermined times and/or manually. For example, client 304 may be the only client receiving the CIF resolution video streams from client 301 and client 303. If client 304 drops out of the video conference call, video conference server 120 may request that client 301 and client 303 stop encoding and sending a CIF resolution version of their respective video streams. Video conference server also notifies client 303 to stop the cross-link that was established with client 304.

Video conference server 120 may instruct at least one of the clients associated with the video conference call to encode a video stream determined to be in-use by one of the other clients associated with the video conference call. For example, video conference server 120 may determine that client 304 is currently using CIF decoding; video conference server 120 may instruct client 303 to encode a CIF resolution stream to send to video conference server 120 that may be relayed to another server.

Figure 4:
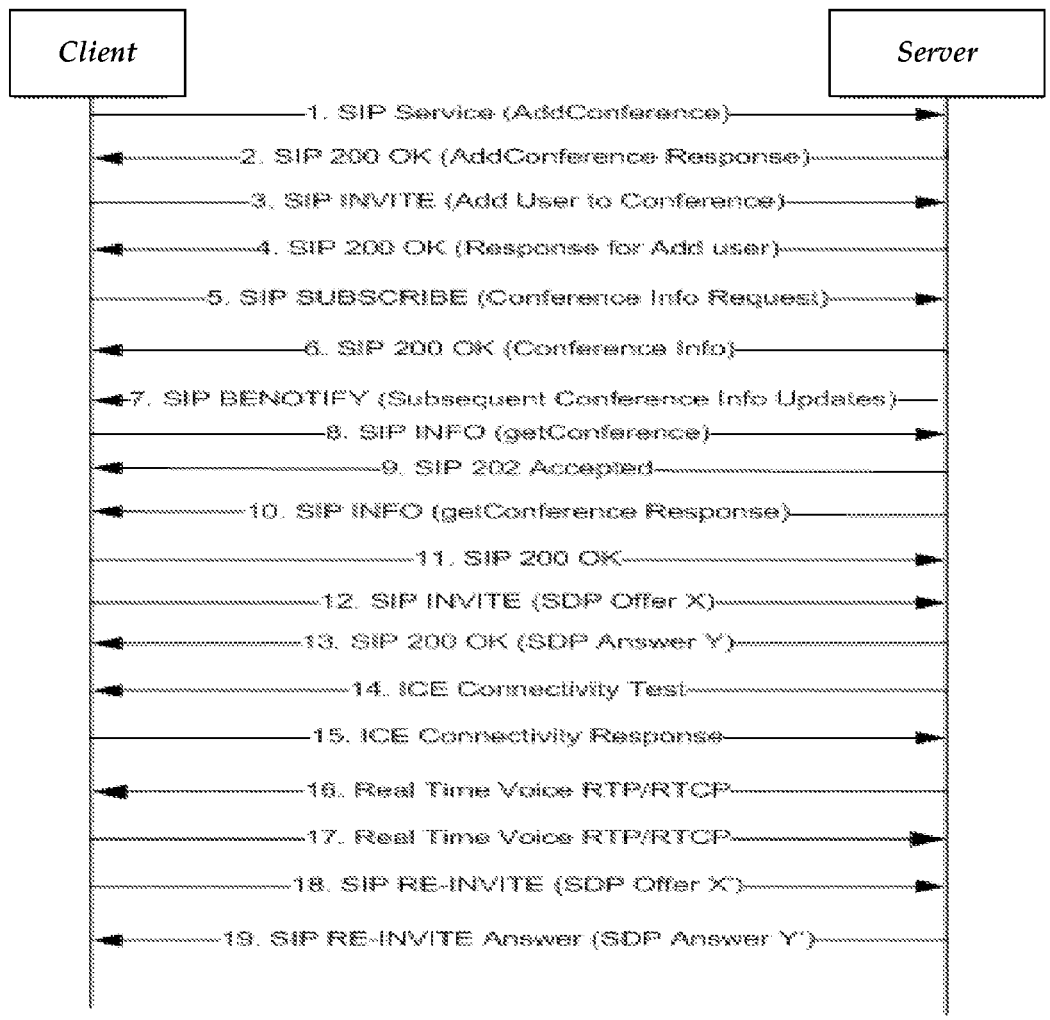
FIG. 4 illustrates an exemplary conference create process between a client and a server.

FIG. 4 illustrates an exemplary conference create process between a client and a server. The create process illustrated and described uses the [MS-CONFPRO] Centralized Conference Control Protocol Provisioning Specification, the [MS-SIPRE] Session Initiation Protocol (SIP) Routing Extensions Specification, the [MS-CONFBAS] Centralized Conference Control Protocol: Basic Architecture and Signaling Specification, [MS-CONFAV] Centralized Conference Control Protocol: Audio-Video Extensions and [MS-SDPEXT] Session Description Protocol (SDP) Version 2.0 Protocol Extensions, [MS-AVEDGEA]: Audio Video Edge Authentication Protocol Specification, [MS-TURN]: Traversal Using Relay NAT (TURN) Extensions, [MS-ICE]: Interactive Connectivity Establishment (ICE) Extensions, [MS-RTP]: Real-time Transport Protocol (RTP) Extensions, [MS-RTPRADEX]: RTP Payload for Redundant Audio Data Extensions, [MS-SRTP]: Secure Real-time Transport Protocol (SRTP) Extensions and [MS-SSRTP]: Scale Secure Real-time Transport Protocol (SSRTP) Extensions. Consistent with embodiments of the invention, other specifications may be utilized. The following is an exemplary call flow.

At step 1, the Client sends a request to the Server to instantiate a conference (addconference).

At step 2, the Server responds to the Client with a Conference URI that is a Session Initiation Protocol (SIP) URI that uniquely identifies the Focus of a conference. According to an embodiment, the server maintains a dialog and Session Initiation Protocol (SIP) signaling relationship with each client that is participating in the conference, implements conference policies, and helps to ensure that each participant receives the media that comprise the tightly coupled conference.

At step 3, the Client sends a SIP INVITE Message to the Server to join the conference (adduser) instantiated in step 1.

At step 4, the Server sends SIP 200 OK containing the Join Response (adduser response) to the Client.

At step 5, the Client sends SIP SUBSCRIBE message to the Server to subscribe to the Conference Information.

At step 6, the Server sends SIP 200 OK with the Conference information document, and the Video Conference Server URI to the Client.

At step 7, the Server sends SIP BENOTIFY to the Client containing Subsequent Roster Updates.

At step 8, the Client sends a SIP INFO Message with getconference request to the Server.

At step 9, the Server sends SIP 202 Accepted message to the Client.

At step 10, the Server sends SIP INFO with a getconference response to the Client.

At step 11, the Client sends SIP 200 OK to the Server.

At step 12, the Client sends SIP INVITE with SDP Offer to the Server. The Client sends a request to allocate media ports on an edge server for ICE candidates. The Server returns allocated media ports to the Client.

At step 13, SIP 200 OK with SDP Answer from the Server to Client. The second Client sends a request to allocate media ports on an edge server for ICE candidates. The Server returns allocated media ports to the second Client.

At step 14, the Server initiates ICE Connectivity Tests to the Client.

At step 15, the Client sends ICE Connectivity Response to the Server.

At step 16, RTP/RTCP Voice Packets from the Server to the Client.

At step 17, RTP/RTCP Voice Packets from the Client to the Server.

At step 18, the Client sends updated Media Description offer to the Server.

At step 19, the Server sends a media description answer to the Client.

Figure 5:
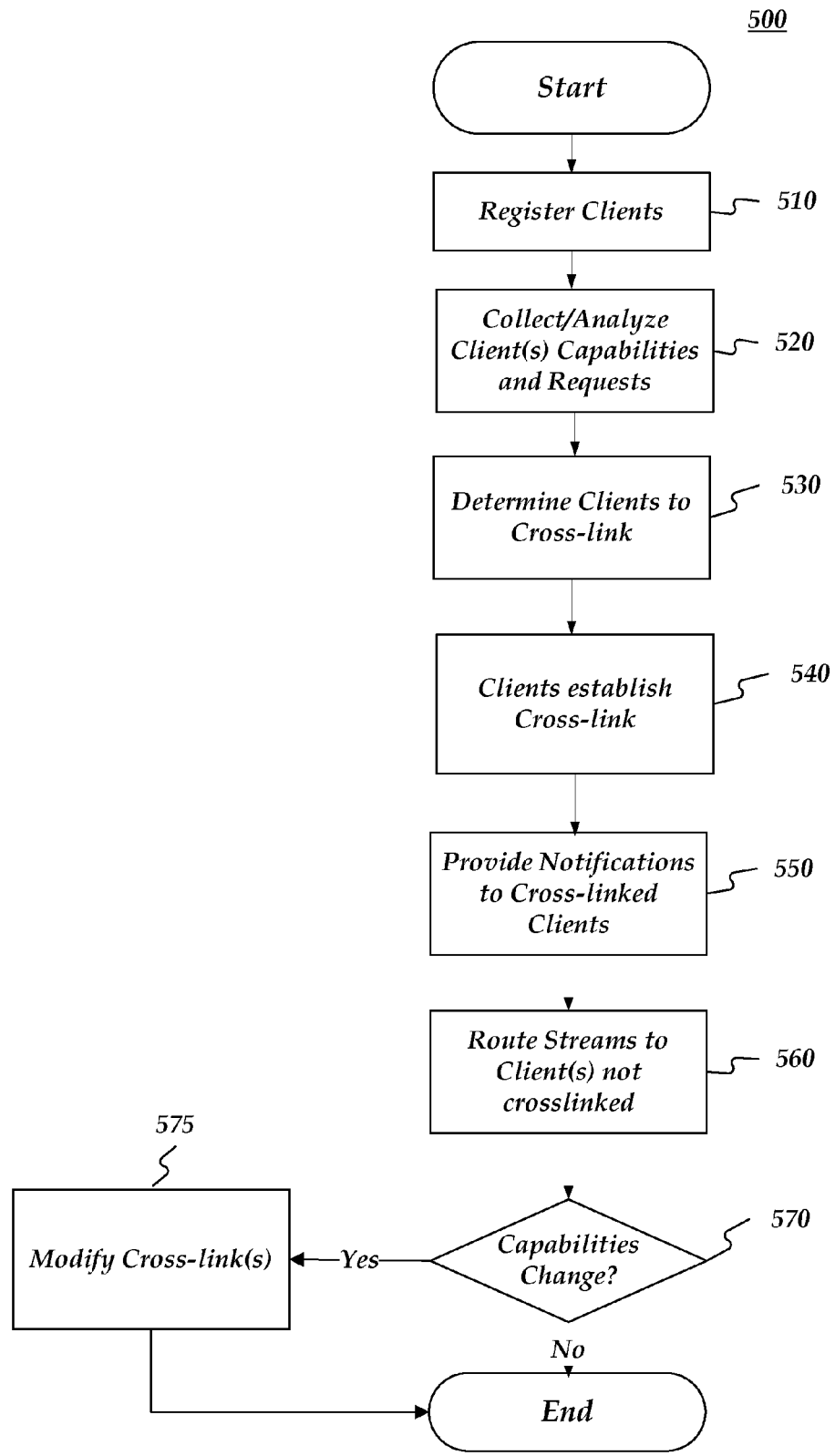
FIG. 5 is a flow chart illustrating a video conference system using cross-links and a video conference server.
Figure 6:
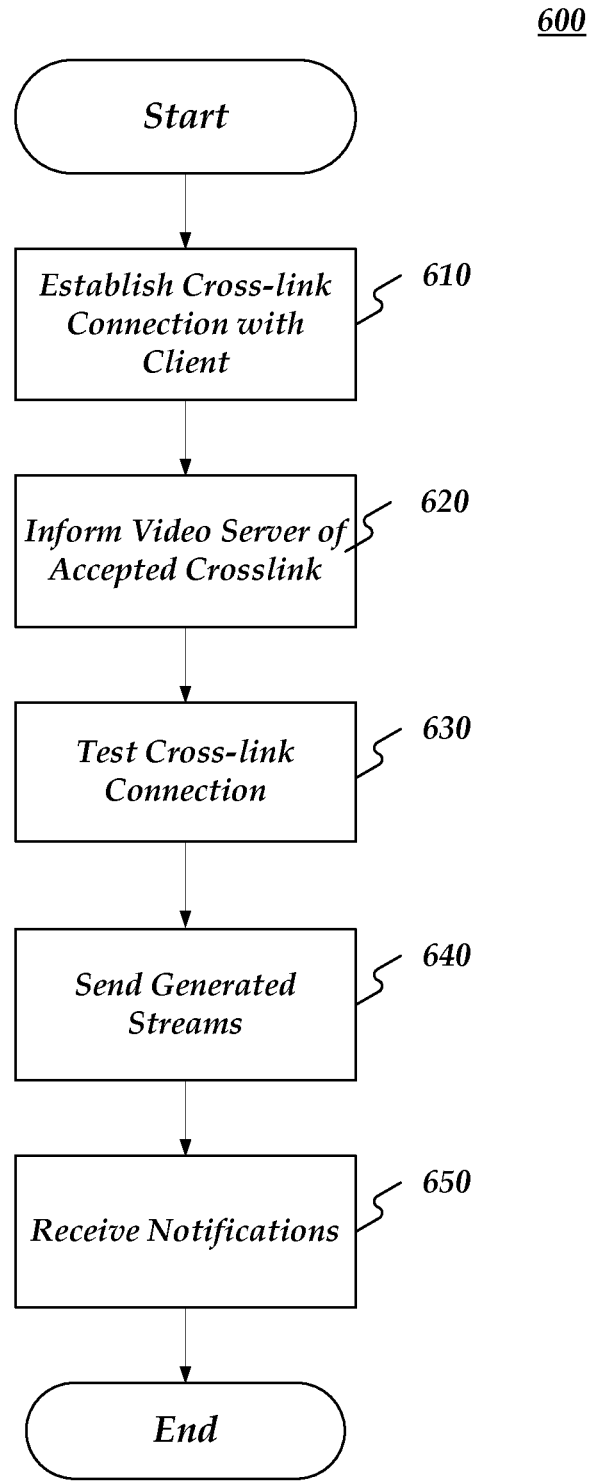
FIG. 6 is a flow chart illustrating a client in a video conference system using and establishing a cross-link and a video conference server.

Referring now to FIGS. 5-6, illustrative processes for using cross-links in a video conference will be described. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 5 is a flow chart illustrating a video conference system using cross-links and a video conference server.

After a start block, the operation flows to operation 510, where clients are registered. For example, a client may be operatively connected to computing device 700 via a network connection and may request participation in a video conference call hosted by computing device 700.

Moving to operation 520, capabilities and requests of each registered client are collected and/or analyzed. For example, computing device 700 may determine an amount of bandwidth available to each client. Computing device 700 may also determine data processing capabilities for each client, such as video encoding and/or decoding capability and/or data processing speed. Video encoding/decoding capability may include a resolution capability, such as a maximum resolution capability. A subscription request may also be received from at least one client in the video conference. For example, computing device 700 may receive a subscription request from one client for a VGA encoded, 30 fps stream from a second client. The request may include information such as a desired resolution, bitratre and frame rate. Consistent with embodiments of the invention, computing device 700 may receive multiple subscription requests from any and/or all of the clients participating in the video conference. For example, one client may request lower resolution versions of all the other participating clients; another client may request a high resolution version from whichever client may be designated an active speaker in the video conference and low resolution versions from some or all of the other clients.

Moving to operation 530, the clients to cross-link are determined based on the clients capabilities and received requests. Generally, clients are selected for cross-linking that have enough bandwidth and processing power for efficiently encoding/decoding streams. The number of requested streams may also be used in determining when to cross-link clients. For example, many conferences are two party conferences. In two party conferences it is generally beneficial to move the media processing off of a video conference server, without affecting the focus or the video conference server signaling. Cross-linking these small conferences reduces a large amount of bandwidth that would be needed by the video conference server without the established cross-link. The resolution of the requested streams between clients may also be used. For example, moving higher bandwidth streams off of the video conference server reduce the bandwidth to the video conference server.

Flowing to operation 540, the cross-links are established between the clients. Each cross-link establishes a point-to-point communication between two of the clients of the video conference. Clients that are cross-linked may send all or a portion of the streams directed to each other directly using the cross-link. For example, a cross-link may be established to only send video using the cross-link, while audio streams are routed through the video conference server. A cross-link may also be established to send video, audio, and data streams through the cross-link (See FIG. 6 and related discussion).

Transitioning to operation 550, cross-linked clients are provided with notifications from the video conference server. For example, the notifications may be a dominant speaker change, a client dropping out of the conference, a client being added to the conference, a change in capability of one or more of the clients, and the like.

Flowing to operation 560, the video conference server routes streams to clients that are not cross-linked. For example, a video conference server may receive a stream from a client that is cross-linked that is to be delivered to a client that is not cross-linked.

Transitioning to decision operation 570, a determination is made as to whether the capabilities of a client have changed. When the capabilities of a client and/or the requirements of the system have changed, method 500 may move to operation 575 where the cross-links may be modified. Many modifications may be made to a cross-link. A cross-link may be removed, the amount of streams using the cross-link may be changed (increased, decreased), a cross-link may be added, and the like.

When the capabilities do not change, the process flows to an end operation and returns to processing other actions.

FIG. 6 is a flow chart illustrating a client in a video conference system using and establishing a cross-link and a video conference server.

After a start operation, the process flows to operation 610 where a client establishes a cross-link with another client. The video conference server sends a message to the clients indicating that a cross-link is to be established. Consistent with embodiments of the invention, the video conference server sends a message to one of the clients (the establishing client) to establish the cross-link with a second client (the receiving client). The video conference server also sends the receiving client a message indicating that an invitation to establish a cross-link will be coming from the establishing client. The video conference server may also send a password to the establishing client and the receiving client such that the invitation may be automatically accepted. The establishing client makes a call to the receiving client and establishes the cross-link directly with the client.

Flowing to operation 620, the video conference server is informed of the established cross-link. Consistent with embodiments of the invention, both clients inform the server of the established cross-link. Alternatively, one of the clients may inform the server of the established cross-link.

Transitioning to operation 630, the cross-link connection may be tested. For example, the clients may compare the quality/speed of the cross-link connection against the quality/speed of the connection through the video conference server. When the cross-link connection is determined to be acceptable then the video conference server may stop sending streams between the cross-linked clients. When the cross-link connection is not acceptable, the video conference server may instruct the clients to remove the cross-link and use the connection through the video conference server.

Flowing to operation 640, the client sends generated streams to the determined destinations. Some of the destinations may be cross-linked clients in which case the streams are sent directly to the client and another destination may be a video conference server in which case the streams are sent to the video conference server. A stream may be sent to both the video conference server and to one or more cross-linked clients.

Moving to operation 650, the cross-linked client receives notifications from the video conference server. For example, the notifications may be a dominant speaker change, a client dropping out of the conference, a client being added to the conference, a change in capability of one or more of the clients, and the like.

Figure 7:
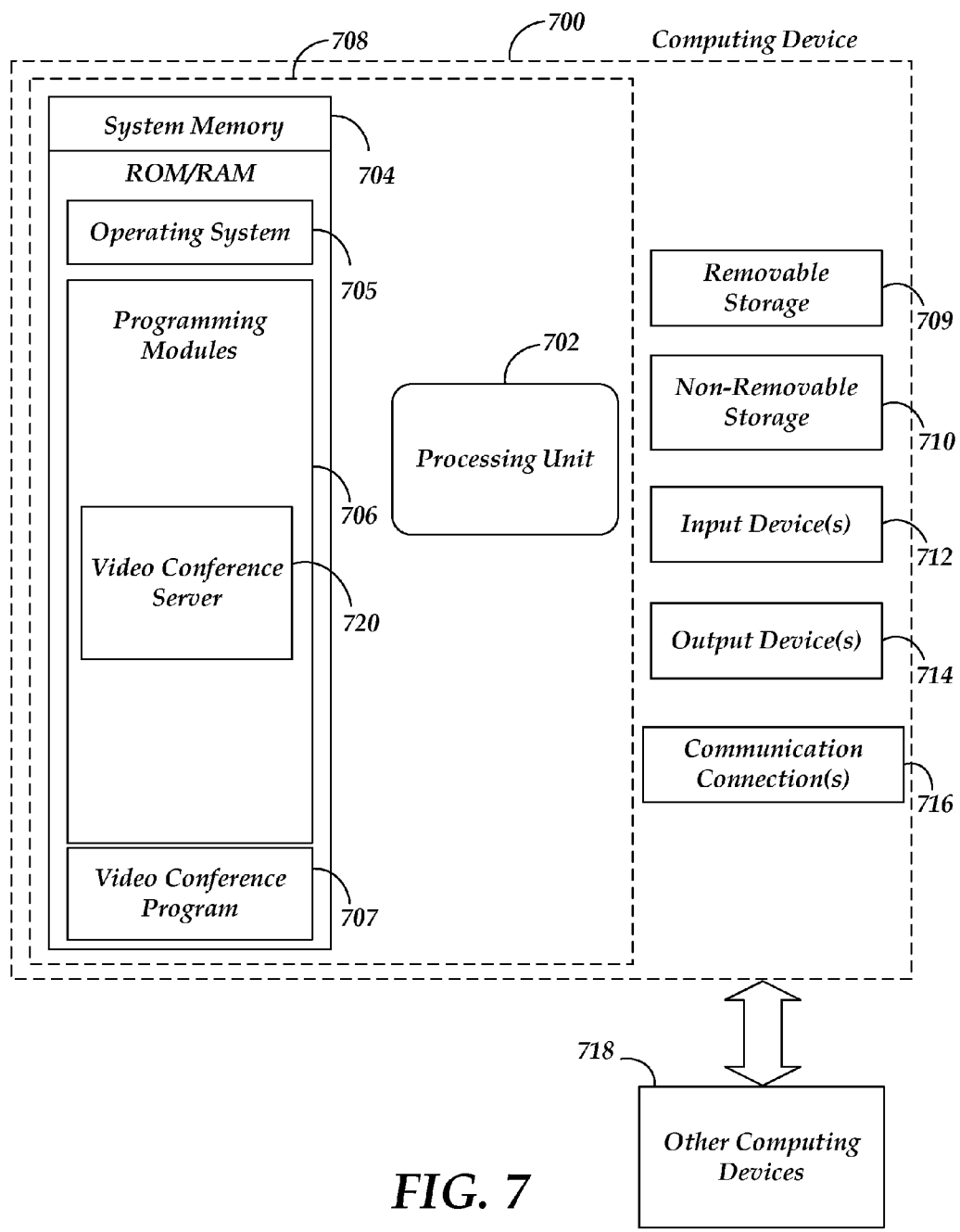
FIG. 7 is a block diagram of a system including a computing device.

FIG. 7 is a block diagram of a system including computing device 700. Consistent with an embodiment of the invention, the aforementioned memory storage and processing unit may be implemented in a computing device, such as computing device 700 of FIG. 7. Any suitable combination of hardware, software, or firmware may be used to implement the memory storage and processing unit. For example, the memory storage and processing unit may be implemented with computing device 700 or any of other computing devices 718, in combination with computing device 700. The aforementioned system, device, and processors are examples and other systems, devices, and processors may comprise the aforementioned memory storage and processing unit, consistent with embodiments of the invention. Furthermore, computing device 700 may comprise an operating environment for system 100 as described above. System 100 may operate in other environments and is not limited to computing device 700.

With reference to FIG. 7, a system consistent with an embodiment of the invention may include a computing device, such as computing device 700. In a basic configuration, computing device 700 may include at least one processing unit 702 and a system memory 704. Depending on the configuration and type of computing device, system memory 704 may comprise, but is not limited to, volatile (e.g. random access memory (RAM)), non-volatile (e.g. read-only memory (ROM)), flash memory, or any combination. System memory 704 may include operating system 705, one or more programming modules 706, and may include a program 707 relating to determining capabilities and the encoding/decoding of video. Operating system 705, for example, may be suitable for controlling computing device 700's operation. In one embodiment, programming modules 706 may include, for example, a data analysis module and/or a video conference server 720. Furthermore, embodiments of the invention may be practiced in conjunction with a graphics library, other operating systems, or any other application program and is not limited to any particular application or system. This basic configuration is illustrated in FIG. 7 by those components within a dashed line 708.

Computing device 700 may have additional features or functionality. For example, computing device 700 may also include additional data storage devices (removable and/or non-removable) such as, for example, magnetic disks, optical disks, or tape. Such additional storage is illustrated in FIG. 7 by a removable storage 709 and a non-removable storage 710.

The term computer readable media as used herein may include computer storage media. Computer storage media may include volatile and nonvolatile, removable and non-removable media implemented in any method or technology for storage of information, such as computer readable instructions, data structures, program modules, or other data. System memory 704, removable storage 709, and non-removable storage 710 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 700. Any such computer storage media may be part of device 700. Computing device 700 may also have input device(s) 712 such as a camera, keyboard, a mouse, a pen, a sound input device, a touch input device, etc. Output device(s) 714 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Computing device 700 may also contain a communication connection 716 that may allow device 700 to communicate with other computing devices 718, such as over a network in a distributed computing environment, for example, an intranet or the Internet. Communication connection 716 is one example of communication media.

As stated above, a number of program modules and data files may be stored in system memory 704, including operating system 705. While executing on processing unit 702, programming modules 706 (e.g. video conference server 720) may perform processes including, for example, one or more of method stages as described above. The aforementioned process is an example, and processing unit 702 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for cross-linking clients and using a video conference server to manage the clients within the video conference, comprising:
    establishing a first connection between a first client and a server in a video conference and establishing a second connection between a second client and the server in the video conference;
    determining a first capability of the first client and a second capability of the second client; wherein the first capability and the second capability is an ability to encode and decode streams that are used within the video conference;
    in response to determining a first capability of the first client and a second capability of the second client, sending a request from the video conference server to at least one of the first client and the second client to establish a cross-link connection between the first client and the second client, wherein after the cross-link connection is established a stream is delivered between the first client and the second client without passing through the video conference server; and
    using the video conference server to manage the first client and the second client in the video conference.

2. The method of claim 1, further comprising at least one of the clients determining when the cross-link connection is faster than the connection established with the server for delivering streams.

3. The method of claim 1, further comprising instructing the first client and the second client to stop sending generated streams to the server after the cross-link is established.

4. The method of claim 1, further comprising sending a notification to the first client and the second client in response to a dominant speaker change in the video conference.

5. The method of claim 1, wherein determining the capability comprises determining a bandwidth of at least one communication medium associated with the first client and the second client and determining a processing power for each of the first client and the second client.

6. The method of claim 1, wherein managing the video conference comprises accepting a subscription to the video conference from a third client while maintaining the cross-link connection between the first client and the second client.

7. The method of claim 6, further comprising instructing the first client to send a generated stream to the server and to the second client when the third client is not cross-linked to the first client, wherein the server routes the generated stream to the third client.

8. The method of claim 2, further comprising determining when conditions change within the video conference and in response to the conditions changing, modifying the cross-link, wherein modifying the cross-link changes a data flow between the first client and the second client.

9. The method of claim 1, wherein determining when conditions change within the video conference comprises determining when a bandwidth limitation is reached.

10. A computer-readable storage medium which stores a set of instructions which when executed performs a method for cross-linking clients and using a video conference server to manage the clients within the video conference, the method executed by the set of instructions comprising:
    establishing for each client of the video conference a connection with the video server;
    determining capabilities for each client within the video conference, wherein the capabilities include at least an encoding ability and an available bandwidth;
    determining at the video server the clients to cross-link within the video conference;
    establishing the cross-link between each of the determined clients, wherein after the cross-link connection is established a stream is delivered between at least two of the clients that are cross-linked without passing through the video conference server; and
    using the video conference server to manage the cross-linked clients and the other clients in the video conference.

11. The computer-readable storage medium of claim 10, further comprising for each of the established cross-link determining when to use the cross-link connection in place of the connection with the server.

12. The computer-readable storage medium of claim 10, further comprising instructing at least some of the cross-linked clients to stop sending generated streams to the server.

13. The computer-readable storage medium of claim 10, further comprising sending a notification to the cross-linked clients in response to a dominant speaker change in the video conference.

14. The computer-readable storage medium of claim 10, wherein the stream is a video stream, and wherein an audio stream that is associated with the video stream is processed and routed by the video conference server.

15. The computer-readable storage medium of claim 10, wherein managing the video conference comprises accepting a subscription to the video conference from a new client after establishing the cross-links and determining when to establish a cross-link connection for the new client.

16. The computer-readable storage medium of claim 15, further comprising instructing a cross-linked client to send a generated stream to the server, wherein the server routes the generated stream to a client that is not cross-linked to the instructed client.

17. The computer-readable storage medium of claim 11, further comprising determining when conditions change within the video conference and in response to the conditions changing, modifying at least one of the cross-links, wherein modifying the cross-link changes an amount of data flow between the clients of the modified cross-link.

18. The computer-readable storage medium of claim 10, wherein determining when conditions change within the video conference comprises determining when a bandwidth limitation is reached.

19. A system for generating streams cross-links clients and uses a video conference server to manage the clients within the video conference, the system comprising:
    a memory storage;
    a network connection device; and
    a processing unit coupled to the memory storage, wherein the processing unit is operative to:

register a first video conference client and a second video conference client operatively connected to the system via the network connection device, wherein being operative to register the first video conference client and the second video conference client comprises being operative to establish capabilities for the first video conference client and the second video conference client, wherein the capabilities are used to determine an encoding ability;

establish a cross-link between the first video conference client and the second video conference client when determined based on the capabilities of the first video conference client and the second video conference client; wherein a stream that is sent to the second video conference client from the first video conference client is not processed by the processing unit;

receive a stream from the first video conference client, and route the stream to another client in the video conference.

20. The system of claim 19, further comprising notifying the first video conference client and the second video conference client upon a speaker change in the video conference.

* * * * *